United States Patent [19]

Compernass et al.

[11] 3,847,630
[45] Nov. 12, 1974

[54] METHOD FOR THE PRODUCTION OF WATER-PERMEABLE POROUS CONCRETE

[75] Inventors: Josef Compernass, Nieder-Liebersbach; Eberhard Grünberger, Dusseldorf-Wersten; Friedo Eberhard Schmidt, Mannheim-Freudenheim, all of Germany

[73] Assignee: Henkel & Cie GmbH, Dusseldorf-Holthausen, Germany

[22] Filed: Oct. 27, 1972

[21] Appl. No.: 301,380

Related U.S. Application Data

[63] Continuation-in-part of Ser. No. 79,666, Oct. 9, 1970, abandoned.

[30] Foreign Application Priority Data

Oct. 22, 1969  Germany............................ 1953158
Oct. 22, 1969  Germany............................ 1953159

[52] U.S. Cl......................... 106/90, 106/93, 106/97
[51] Int. Cl................................................ C04b 7/02
[58] Field of Search ..................... 106/90, 92, 93, 97

[56] References Cited
UNITED STATES PATENTS

| | | | |
|---|---|---|---|
| 3,030,258 | 4/1962 | Wagner.................................. | 106/93 |
| 3,141,857 | 7/1964 | Sommer................................. | 106/90 |
| 3,215,549 | 11/1965 | Ericson.................................. | 106/90 |
| 2,934,932 | 5/1960 | Wagner.................................. | 106/90 |
| 2,576,955 | 12/1951 | Ludwig.................................. | 106/90 |
| 2,985,239 | 5/1961 | Shell...................................... | 106/97 |
| 2,864,714 | 12/1958 | Dixon et al........................... | 106/88 |

FOREIGN PATENTS OR APPLICATIONS

| | | | |
|---|---|---|---|
| 938,567 | 10/1963 | Great Britain......................... | 106/90 |
| 1,416,211 | 9/1965 | France................................... | 106/92 |

OTHER PUBLICATIONS

Taylor, W. H., Concrete Technology & Practice, American Elsevier, pp. 188–189, 352–353, (1965).

*Primary Examiner*—Delbert E. Gantz
*Assistant Examiner*—James W. Hellwege
*Attorney, Agent, or Firm*—Hammond & Littell

[57] ABSTRACT

A method for the production of a water-permeable porous concrete comprising the steps of mixing a concrete mixture containing a. granular mineral aggregates of a uniform grain fraction in the range of 3 to 30 mm with a tolerance range of 4 to 15 mm, b. hydraulic cement in the prescribed amount according to the job specifications, c. a macromolecular water-soluble compound in an amount of from 0.05 to 2 percent by weight based on the cement, said compound being selected from the group consisting of plant gums, starch products, cellulose ethers, and synthetic polymers.

d. water in such an amount that the water-cement ratio is between 0.32 and 0.48 whereby said concrete mixture is sprayable, and placing said concrete mixture by spraying, as well as the hardened concrete mixture.

16 Claims, No Drawings

METHOD FOR THE PRODUCTION OF WATER-PERMEABLE POROUS CONCRETE

CROSS-REFERENCE TO PRIOR APPLICATION

This is a continuation-in-part application of copending application Ser. No. 79,666 filed Oct. 9, 1970, and now abandoned.

THE PRIOR ART

In underground concrete linings of tunnels, galleries or in above-ground supporting walls on slopes, etc., the problem is to lead off water issuing from the moisture in the rock or soil of wide areas in such a way that the lining proper is not damaged by the hydrostatic pressure of the water and particularly thus becoming likewise permeable to water.

It is known to drain such areas according to the tubing method where the water is led off by means of drain pipes arranged in the concrete lining. In drifts and tunnels, which are later walled with steel reinforced concrete or with sprayed concrete or an anchorage, the areas in question were protected against rock moisture by foil insulation and the water between the lining and the insulation was led off by ribbed foils, tube drainages, etc. In rock sections under pressure the back water can seep more or less uncontrolled through the compressed wood layers of the forms.

It has already been tried to eliminate this inconvenience with special filtering stones which were arranged as a porous wall without an intermediate layer on the rock. On this porous wall was then applied the sprayed concrete lining. The area pressure relief and elimination of the water through the porous wall prevented the uncontrollable issuance of water in larger quantities, but the porous wall of hollow bricks can only be used up to the side wall because the filtering stones cannot absorb any roof pressure.

OBJECTS OF THE INVENTION

An object of the present invention is the development of a concrete mixture which is sprayable and sets up as a porous concrete which can absorb static pressure after a short time.

Another object of the present invention is the development of a method for the production of a water-permeable porous concrete comprising the steps of mixing a concrete mixture containing a. granular mineral aggregates of a uniform grain fraction in the range of 3 to 30 mm with a tolerance range of 4 to 15 mm, b. hydraulic cement in the prescribed amount according to the job specifications, c. a macromolecular water-soluble compound in an amount of from 0.05 to 2 percent by weight based on the cement, said macromolecular water-soluble compound being selected from the group consisting of plant gums, starch products, cellulose ethers and synthetic polymers, and d. water in such an amount that the water-cement ratio is between 0.32 and 0.48, whereby said concrete mixture is sprayable, and placing said concrete mixture by spraying.

A further object of the present invention is the development of a sprayable concrete mixture which sets up to a porous concrete consisting essentially of an intimate mixture of a. granular mineral aggregates of a uniform grain fraction in the range of 3 to 30 mm with a tolerance range of 4 to 15 mm, b. hydraulic cement in the prescribed amount according to the job specifications, c. a macromolecular water-soluble compound in an amount of from 0.05 to 2 percent by weight based on the cement, said macromolecular water-soluble compound being selected from the group consisting of plant gums, starch products, cellulose ethers and synthetic polymers, and d. water in such an amount that the water-cement ratio is between 0.32 and 0.48.

A yet further object of the present invention is the porous concrete produced by the above process after setting up.

These and other objects of the invention will become more apparent as the description thereof proceeds.

DESCRIPTION OF THE INVENTION

The above objects have been achieved and the drawbacks of the prior art have been overcome by the development of a method for the production of a water-permeable porous concrete comprising the steps of mixing a concrete mixture containing a. granular mineral aggregates of a uniform grain fraction in the range of 3 to 30 mm with a tolerance range of 4 to 15 mm, b. hydraulic cement in the prescribed amount according to the job specifications, c. a macromolecular water-soluble compound in an amount of from 0.05 to 2 percent by weight based on the cement, said macromolecular water-soluble compound being selected from the group consisting of plant gums, starch products, cellulose ethers and synthetic polymers, and d. water in such an amount that the water-cement ratio is between 0.32 and 0.48, whereby said concrete mixture is sprayable, and placing said concrete mixture by spraying.

The concrete mixture used according to the invention contains a. granular mineral aggregates of a uniform grain fraction in the range of 3 to 30 mm with a tolerance range of 4 to 15 mm, b. a macromolecular water-soluble substance in an amount of from 0.05 to 2.0 percent by weight, based on the cement, and a water-cement ratio of about 0.32 to 0.48 is maintained.

For the production of the concrete mixture according to the invention, ordinary granular mineral aggregates can be used such as broken stones or minerals containing swelling aggregates like pumice, clay, slate, lavalite, etc. Preferably, the mineral fillers should have an oval or round structure so that the individual grains can easily slide past each other during the processing. Gravel is used with advantage as the granular mineral aggregate. It is advisable to keep the tolerance range as low as possible, particularly when using relatively small grain sizes. In some cases it was found expedient to use small quantities of asbestos fibers, in addition to the granular mineral aggregates. The amount of asbestos fibers should not exceed, however, 5 percent of the weight of the aggregates.

Since the special property of a concrete is determined primarily, as known, by the granulation line of its aggregates, the maintenance of the respective characteristic must be achieved by screen or wet sizing and proportionate remixing of the grain fractions. For a so-called single-grain aggregate, which is of advantage for the invention, it is merely necessary to screen out from the entire grain spectrum a certain fraction, which can be achieved with correspondingly graded multiple-deck screens.

Another object of the present invention is to show a new way of preparing gravel and sand as well as other mineral aggregates with which a water-permeable porous concrete can be produced by spraying.

For the production of a suitable gravel, narrow grain fractions of medium size of 3 to 7 mm and/or 15 to 30 mm are preferably screened out from the washed raw material and, after mechanical draining of the respective fraction to a maximum residual moisture of 15 percent, mixed with from 300 to 2,000 gm of said macromolecular water soluble compound per ton of said gravel.

A narrow grain fraction of 3 to 7 mm has a tolerance range of 4 mm, whereas a fraction of 15 to 30 mm has a tolerance range of 15 mm. As the maximum grain size decreases from 30 mm progressively to about 7 mm, the tolerance range decreases progressively at a comparable basis, i.e., for each mm decrease in maximum grain size a tolerance range decrease of one-half mm.

The method according to the invention can be used in the preparation of ordinary material suitable as aggregates for building materials. It is used primarily for the preparation of gravel and sand. But it is also possible to use the method with broken stones or with minerals containing swelling aggregates, like pumice, clay, slate, lavalite, etc. The addition of macromolecular water-soluble substances has here the purpose of utilizing the water-binding power of these substances in order to retain, after dehydration, the residual moisture of the additive materials and to delay the setting process even after a later addition of the necessary cement portion, and to prevent evaporation of this water portion.

Various natural or synthetic polymers can be used as the water-soluble, macromolecular substances. Among the natural water-soluble substances are, for example, the so-called plant gum types, such as galactomannans, like carob-bean flour or guar flour or xanthan gum or water-soluble starch products. To the latter belong, for example, methyl starch, hydroxyethyl starch, carboxymethyl starch or oxidatively decomposed starch. For the production of the concrete mixture according to the invention, preferably water-soluble cellulose ethers are used as water-soluble macromolecular substances. Suitable are, for example, methyl cellulose, hydroxyethyl cellulose, hydroxypropyl cellulose, methylhydroxypropyl cellulose, ethylhydroxyethyl cellulose, hydroxyethyl-carboxymethyl cellulose, etc.

In addition to the above-mentioned water-soluble macromolecular substances various synthetic polymers can also be used, such as polyacrylamide, the alkali metal salts of polyacrylic acid, water-soluble copolymers of acrylamide with acrylamides substituted on the nitrogen, such as the copolymer of acrylamide and N-tert.-butylacrylamide. Also suitable are the water-soluble polyvinylmethyl ethers or polyvinyl alcohol or polyvinyl pyrrolidone as well as their watersoluble copolymers with vinyl acetate. Finally, the alkali metal salts of polystyrene-sulfonic acid can also be used.

According to a preferred embodiment, the macromolecular water-soluble substances can be added simultaneously with the cement portion required for mixing the concrete.

The water-soluble, macromolecular substances can be added in dry powdered form to the washed or screened material, but it is also possible to make them into a paste with water or to dissolve them and add them in this form. The mixing is effected preferably in pressure mixers.

For the production of the concrete mixtures, hydraulic cements are used, such as for example blast furnace cement, iron-ore cement, slag cement, Portland cement, pozzolana cement or melted clay cements, such as relatively high aluminum cements. These hydraulic cements are cements that harden under water, or by reaction with water. So much water is added that a ratio of water to cement of 0.32 to 0.48 is maintained. In this connection, the natural moisture of the aggregates must naturally be taken into account. If gravel is used, it usually has a moisture content of about 5 to 15 percent. It must be considered surprising that concrete mixtures of sprayable consistency can be obtained with the method according to the invention even where the water-cement ratio is less than 0.38.

According to an advantageous embodiment, anionic or non-ionic wetting agents are added to the concrete mixtures according to the invention. They should be added in an amount of about 0.005 to 0.008 percent by weight, based on the cement. As wetting agents can be used, for example, alkali metal salts, particularly sodium salts of sulfonic acids, such as dodecylbenzenesulfonic acid, or fatty alcohol sulfuric acid half esters. For example, the sodium lauryl sulfate can be used with good results. As non-ionogenic wetting agents are used particularly the addition products of ethylene oxide to alkyl phenols or to fatty alcohols. A suitable wetting agent from this group is, for example, the addition product of 9 mols of ethylene oxide to 1 mol of nonylphenol.

Finally, additions of aqueous dispersions of thermoplastic materials, particularly polyvinyl esters, as well as aqueous dispersions of bitumen can be added to the concrete mixtures according to the invention. As aqueous dispersions of thermoplastic materials, particularly, the commercial dispersions of polyvinyl propionate, polyvinyl acetate or the copolymers of butadiene and styrene are suitable.

The production of the concrete mixtures according to the invention is effected in ordinary mixers, particularly pressure mixers. The water-soluble, macromolecular substances can be added either in solid form or as concentrated aqueous solutions or pastes. The same holds true for the anionic or non-ionic wetting agents.

It has been found expedient to use mixtures which contain 1,000 kg to 2,000 kg of aggregates, like gravel, per 200 kg to 300 kg of blast furnace cement. In some cases, it may also be advisable to add known accelerators to the concrete mixtures. Particularly suitable are, for example, calcium chloride, silica or water glass.

The method according to the invention permits for the first time to spray porous concrete by pneumatic means. In this wet spraying, there is not only little rebound, due to the good initial adhesion, but the rebound can be used again. It is thus no longer necessary to remove the unusable rebound from the construction site, as in other methods. Nor is it necessary, as it is customary, to use forms in the production of porous concrete. With the porous concrete according to the invention it is readily possible to apply layers of up to 25 cm in thickness in one operation. With the hitherto known sprayed concrete it was not possible to obtain layer thicknesses of more than 5 to 10 mm.

To these mixtures were added various amounts of watersoluble macromolecular substances and wetting agents. The following table contains in the first column the example number of the formulation. This is followed by the concrete mixture used, the amount and type of the water-soluble macromolecular substance, and the wetting agent.

| Example | Mixture | Water-soluble macromolecular substance | Wetting Agent |
| --- | --- | --- | --- |
| 1 | I | 0.5 kg of hydroxypropylmethyl cellulose, having a viscosity in 2% solution of 80,000 cP according to Höppler at 20 deg. C. | 0 |
| 2 | I | 2.0 kg of methyl cellulose, having a viscosity in 2% solution of 300 cP according to Höppler at 20 deg. C. | 0 |
| 3 | I | 2.0 kg of methyl cellulose, having a viscosity in 2% solution of 300 cP according to Höppler at 20 deg. C. | 0.2 kg of sodium lauryl sulfate |
| 4 *) | I | 1.0 kg of methyl cellulose, having a viscosity in 2% solution of 300 CP according to Höppler at 20 deg. C. | 0.1 kg ethylene oxide adducted on nonyl phenol (molar ratio 9:1) |
| 5 | II | 1.2 kg of methyl cellulose, having a viscosity in 2% solution of 4500 cP according to Höppler at 20 deg. C. | 0.1 kg of sodium lauryl sulfate |
| 6 | II | 0.8 kg of hydroxyethylcarboxylmethylcellulose, having a viscosity in 2% solution of 4000 cP according to Höppler at 20 deg. C. | 0.12 kg of sodium lauryl sulfate |
| 7 | II | 1.0 kg of polyacrylamide having a viscosity in 10% solution of 100,000 cP according to Höppler at 20 deg. C. | 0 |
| 8 | I | 2.0 kg of guar flour, having a viscosity in 2% solution of 10,000 cP according to Höppler at 20 deg. C. | 0.1 kg of ethylene oxide adducted on nonyl phenol (molar ratio 9:1). |
| 9 | III | 0.8 kg of hydroxypropylmethyl cellulose (according to example 1) | 0 |
| 10 | III | 2.0 kg of methyl cellulose (according to example 2) | 0 |
| 11 + | III | 1.0 kg methyl cellulose | 0.1 kg ethyleneoxide adducted on nonylphenol (molar ratio 9 : 1) |

+ To this formula were added 1.2 kg of an aqueous solution containing a 40% solid, which consisted of 80% bitumen and 20% polyvinyl propionate.

The porous concrete according to the invention is not a foamed concrete, but a water-permeable concrete which is structured like a sintered-ball filter, the intervals between the grains being open and cemented substantially only at the contact surfaces.

The porous concrete according to the invention can be used, for example, for walling tunnels or for the production of galleries in mines. A static load is possible already after a short time, so that a reasonable advance in walling can be effected. Nor is it necessary to moisten the concrete for further setting, since the water-retention power of the mixture of cement and macromolecular watersoluble substances is very good.

The following examples are illustrative of the invention without being deemed limitative in any respect.

Various concrete mixtures were produced according to the method of the invention. Mixture I consisted of 250 kg of blast furnace cement, 1,500 kg of gravel (grain size 3 to 7 mm) and so much water that the water-cement ratio was 0.38. Mixture II consisted of 300 kg of blast furnace cement, 1,650 kg of gravel (grain size 15 to 30 mm) and so much water that the water-cement ratio was 0.40. Mixture III consisted of 280 kg of Portland cement, 1,600 kg of gravel (grain size 7 - 15 mm) and so much water that the water-cement ratio was 0.39. Other types of hydraulic cements may be employed as is well-known in the art.

All components were vigorously mixed in a pressure mixer and then sprayed pneumatically. In all cases a porous concrete was obtained after setting which had a strength between about 120 and 280 kg/cm². The water permeability was excellent.

The substances listed in the foregoing table were added either to the finished mixture or to the gravel mixtures obtained by sizing with no difference in result.

COMPARATIVE TESTS A TO D

TEST A: Into a vertical wall of rock material, testing rods with centimeter graduations were struck in at a right angle to the wall. Then mixtures, according to Examples 1 and 3 above, were prepared and sprayed onto the wall to a height of 2 meters and width of 3 meters. A uniform coat was obtained on the wall which was between 20 and 25 cm thick and adhered well.

TEST B: The same mixtures were separately filled to a height of 10 cm in an iron pipe of 10 cm diameter and 50 cm length. The pipe was closed at the bottom by a board. After 7 days the board was removed and within ten seconds, 1 liter of water was poured into the pipe. After 15 more seconds had elapsed, no water stood above the solid layer of the test body. The largest part of the water (more than about three-fourths of a liter) had issued from the bottom of the test body.

TEST C: Mixtures, according to I and II above were prepared without, however, any addition of the water-soluble colloids. It was attempted to spray these mixtures onto a wall, as described in Test A. When this was tried, starting from the bottom, and spraying upwards, the coat thickness decreased gradually, so that on consideration of the total surface, a coat thickness of only 1 to 3 cm was attained. About 80 percent of the sprayed concrete rebounded, as was determined by measuring the rebound volume.

TEST D: Mixtures, according to Examples 1 and 3 above, were prepared, however, instead of the applied grain fraction of between 3 mm and 7 mm, a sand fraction was applied, which possessed no higher grain diameter than 3 mm. These mixtures were filled into pipes, 10 cm high, according to Test B. After 7 days, after removal of the bottom board, 1 liter of water was poured into the pipes each time. After one hour had elapsed, the water level was practically the same as the initial water level.

It can be concluded from the above tests, that both the macromolecular water-soluble compound and the uniform grainsized aggregate are essential to the production of a sprayable concrete which remains porous on setting. Elimination of the macromolecular water-soluble compound from the recipe effects the sprayability of the concrete, and elimination of the uniform grain-sized aggregate effects the porosity of the set concrete.

The preceding specific embodiments are illustrative of the practice of the invention. It is to be understood, however, that other expedients known to those skilled in the art or described herein may be employed without departing from the spirit of the invention or the scope of the appended claims.

We claim:

1. A method for the production of a water-permeable porous concrete comprising the steps of mixing a concrete mixture containing
   a. granular mineral aggregates consisting essentially of a uniform grain fraction in the range of 3 to 30 mm with a tolerance range of 4 to 15 mm.,
   b. hydraulic cement in the prescribed amount according to the job specifications,
   c. a macromolecular water-soluble compound in an amount of from 0.05 to 2 percent by weight based on the cement, said macromolecular water-soluble compound being selected from the group consisting of plant gums, starch products, cellulose ethers and synthetic polymers, and
   d. water in such an amount that the water-cement ratio is between 0.32 and 0.48 whereby said concrete mixture is sprayable, and placing said concrete mixture by spraying.

2. The method of claim 1 wherein said granular mineral aggregate is gravel.

3. The method of claim 2 wherein said gravel is employed in narrow grain fractions of medium size selected from the group consisting of 3 to 7 mm and 15 to 30 mm, and said fractions after draining to a maximum residual moisture content of 15 percent are mixed with from 300 to 2,000 gm of said macromolecular water-soluble compound per ton of said gravel.

4. The method of claim 1 wherein said macromolecular water-soluble compound is a water-soluble cellulose ether.

5. The method of claim 1 wherein said macromolecular water-soluble compound is an alkali metal salt of polyacrylic acid.

6. The method of claim 1 wherein said macromolecular water-soluble compound is a polymer of acrylamide.

7. The method of claim 1 wherein said concrete mixture contains from 0.005 to 0.08 percent by weight, based on the cement, of a wetting agent selected from the group consisting of anionic wetting agents and non-ionic wetting agents.

8. The method of claim 1 wherein said concrete mixture contains a small amount of an aqueous dispersion of a thermoplastic material selected from the group consisting of polyvinyl esters, bitumen and mixtures thereof.

9. The method of claim 1 wherein said concrete mixture contains a small amount of accelerators for cement setting.

10. A sprayable concrete mixture which sets up to a porous concrete consisting essentially of an intimate mixture of
    a. granular mineral aggregates consisting essentially of a uniform grain fraction in the range of 3 to 30 mm with a tolerance range of 4 to 15 mm.,
    b. hydraulic cement in the prescribed amount according to the job specifications,
    c. a macromolecular water-soluble compound in an amount of from 0.05 to 2 percent by weight based on the cement, said macromolecular water-soluble compound being selected from the group consisting of plant gums, starch products, cellulose ethers and synthetic polymers, and
    d. water in such an amount that the water-cement ratio is between 0.32 and 0.48.

11. The sprayable concrete mixture of claim 10 wherein said granular mineral aggregate is gravel.

12. The sprayable concrete mixture of claim 11 wherein said gravel is employed in narrow grain fractions of medium size selected from the group consisting of 3 to 7 mm and 15 to 30 mm, and said fractions after draining to a maximum residual moisture content of 15 percent are mixed with from 300 to 2,000 gm of said macromolecular water-soluble compound per ton of said gravel.

13. The sprayable concrete mixture of claim 10 wherein said macromolecular water-soluble compound is a water-soluble cellulose ether.

14. The sprayable concrete mixture of claim 10 wherein said macromolecular water-soluble compound is an alkali metal salt of polyacrylic acid.

15. The sprayable concrete mixture of claim 10 wherein said macromolecular water-soluble compound is a polymer of acrylamide.

16. The sprayable concrete mixture of claim 10 wherein said concrete mixture contains from 0.005 to 0.08 percent by weight, based on the cement, of a wetting agent selected from the group consisting of anionic wetting agents and non-ionic wetting agents.

* * * * *